United States Patent
Klimt, Jr. et al.

(10) Patent No.: US 9,342,554 B2
(45) Date of Patent: May 17, 2016

(54) TECHNIQUES TO GENERATE MASS PUSH NOTIFICATIONS

(71) Applicant: Facebook, Inc., Menlo Park, CA (US)

(72) Inventors: Bryan Jay Klimt, Jr., Menlo Park, CA (US); Kevin David Lacker, Berkeley, CA (US); Michael Brian Jacokes, Menlo Park, CA (US); Thomas Alan Bouldin, San Francisco, CA (US); David Eitan Poll, Mountain View, CA (US); Ilya Sukhar, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 321 days.

(21) Appl. No.: 13/935,878

(22) Filed: Jul. 5, 2013

(65) Prior Publication Data

US 2015/0012598 A1 Jan. 8, 2015

(51) Int. Cl.
*G06F 15/16* (2006.01)
*G06F 15/173* (2006.01)
*G06F 17/30* (2006.01)
*H04L 12/58* (2006.01)

(52) U.S. Cl.
CPC .......... *G06F 17/30424* (2013.01); *H04L 51/20* (2013.01)

(58) Field of Classification Search
CPC .......................... H04L 51/38; G06F 17/30424
USPC ......................................................... 709/206
See application file for complete search history.

(56) References Cited

U.S. PATENT DOCUMENTS

| | | | | |
|---|---|---|---|---|
| 7,640,322 B2 * | 12/2009 | Wendkos | ............. | H04L 12/585 709/206 |
| 7,644,152 B2 * | 1/2010 | Blanc | .................... | G05B 15/02 709/206 |
| 7,814,222 B2 * | 10/2010 | Venables | ................ | H04L 47/10 709/223 |
| 7,853,674 B2 * | 12/2010 | Shenfield | ............... | H04L 67/20 709/218 |
| 7,903,593 B2 * | 3/2011 | Fuchs | ................. | H04L 12/1836 370/310 |
| 7,958,081 B2 * | 6/2011 | Fitzpatrick | ........ | G06F 17/30867 |
| 7,969,959 B2 * | 6/2011 | Dabbs, III | ............... | H04W 4/06 340/441 |
| 7,979,569 B2 * | 7/2011 | Eisner | .................... | G06F 9/546 709/201 |

(Continued)

*Primary Examiner* — Melvin H Pollack
(74) *Attorney, Agent, or Firm* — Kacvinsky Daisak Bluni, PLLC

(57) ABSTRACT

Techniques to generate mass push notifications are described. In one embodiment, for example, an apparatus may comprise a submission component, a query component, a delivery component, and a record update component. The submission component may be operative to receive a message bundle, the message bundle comprising a message and a query. The query component may be operative to compare the query to a plurality of recipient records to determine a plurality of recipient records matching the query, each of the plurality of recipient records corresponding to a particular installation of a particular application onto a particular device. The delivery component may be operative to broadcast the message to a plurality of installed applications corresponding to the plurality of recipients records matching the query. Other embodiments are described and claimed.

20 Claims, 12 Drawing Sheets

(56) References Cited

U.S. PATENT DOCUMENTS

| | | | | |
|---|---|---|---|---|
| 8,041,020 | B2* | 10/2011 | Drewry | H04M 3/42263 379/201.01 |
| 8,073,565 | B2* | 12/2011 | Johnson | H04W 4/025 455/404.2 |
| 8,090,803 | B2* | 1/2012 | Payne | G08B 25/085 709/219 |
| 8,146,075 | B2* | 3/2012 | Mahajan | G06F 8/43 717/168 |
| 8,166,126 | B2* | 4/2012 | Bristow | H04L 12/5855 370/335 |
| 8,209,386 | B2* | 6/2012 | Yasrebi | G06Q 10/107 709/206 |
| 8,209,392 | B2* | 6/2012 | Brabec | H04L 12/58 709/203 |
| 8,234,338 | B1* | 7/2012 | Dagum | H04L 51/30 709/201 |
| 8,406,758 | B2* | 3/2013 | Tagg | H04W 8/18 455/432.1 |
| 8,478,616 | B2* | 7/2013 | De Klerk | G06F 8/10 705/348 |
| 8,706,822 | B2* | 4/2014 | Ickman | G06F 9/542 709/206 |
| 8,738,715 | B2* | 5/2014 | Roy | G06Q 10/107 709/206 |
| 8,761,737 | B2* | 6/2014 | Clarke | H04L 12/5885 370/338 |
| 8,788,881 | B2* | 7/2014 | Salomon | H04W 4/00 455/466 |
| 8,984,048 | B1* | 3/2015 | Maniscalco | G06F 17/30887 709/201 |
| 9,100,291 | B2* | 8/2015 | Ruddick | H04L 43/028 |
| 9,241,265 | B2* | 1/2016 | Puura | H04W 4/14 |
| 2011/0010641 | A1* | 1/2011 | Wolff | G06Q 10/107 715/753 |
| 2012/0102402 | A1* | 4/2012 | Kwong | G06F 3/038 715/705 |
| 2012/0136905 | A1* | 5/2012 | Pullara | G06F 17/30994 707/803 |
| 2012/0179767 | A1* | 7/2012 | Clarke | H04L 51/34 709/206 |
| 2012/0190325 | A1* | 7/2012 | Abu-Hakima | H04L 12/1845 455/404.2 |
| 2013/0072257 | A1* | 3/2013 | Evans | H04W 12/04 455/558 |
| 2013/0159443 | A1* | 6/2013 | Dellenbach | H04L 12/5815 709/206 |
| 2013/0190032 | A1* | 7/2013 | Li | H04L 67/28 455/517 |
| 2014/0067911 | A1* | 3/2014 | Block | G06Q 50/01 709/203 |
| 2014/0201289 | A1* | 7/2014 | Wheeler | H04L 12/58 709/206 |
| 2014/0237055 | A1* | 8/2014 | Burrell | H04L 51/28 709/206 |
| 2014/0280453 | A1* | 9/2014 | Mattison | H04L 12/1854 709/202 |
| 2014/0310365 | A1* | 10/2014 | Sample | H04L 51/16 709/206 |
| 2015/0046267 | A1* | 2/2015 | MacTiernan | H04L 51/32 705/14.66 |

\* cited by examiner

1000

Receive a message bundle, the message bundle comprising a message and a query.
1002

Compare the query to a plurality of recipient records to determine a plurality of recipients.
1004

Submit a plurality of notifications to one or more notification services, each of the plurality of notifications corresponding to one of the plurality of recipients and comprising the message.
1006

*FIG. 10*

TECHNIQUES TO GENERATE MASS PUSH NOTIFICATIONS

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to generate mass push notifications. Some embodiments are particularly directed to techniques to generate mass push notifications by applying a query over a group of record to determine the recipients of the notification. In one embodiment, for example, an apparatus may comprise a submission component, a query component, a delivery component, and a record update component. The submission component may be operative to receive a message bundle, the message bundle comprising message and a query. The query component operative may be operative to compare the query to a plurality of recipient records to determine a plurality of recipient records matching the query, each of the plurality of recipient records corresponding to a particular installation of a particular application onto a particular device. The delivery component may be operative to broadcast the message to a plurality of installed applications corresponding to the plurality of recipients matching the query. The record update component may be operative to receive a recipient record update from an installed application on a mobile device, the recipient record update comprising a current location of the mobile device, and to update a recipient record according to the recipient record update, the recipient record corresponding to the installed application. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 10 illustrates an embodiment of a logic flow for the notification support system of FIG. 1.

DETAILED DESCRIPTION

Figure 1:
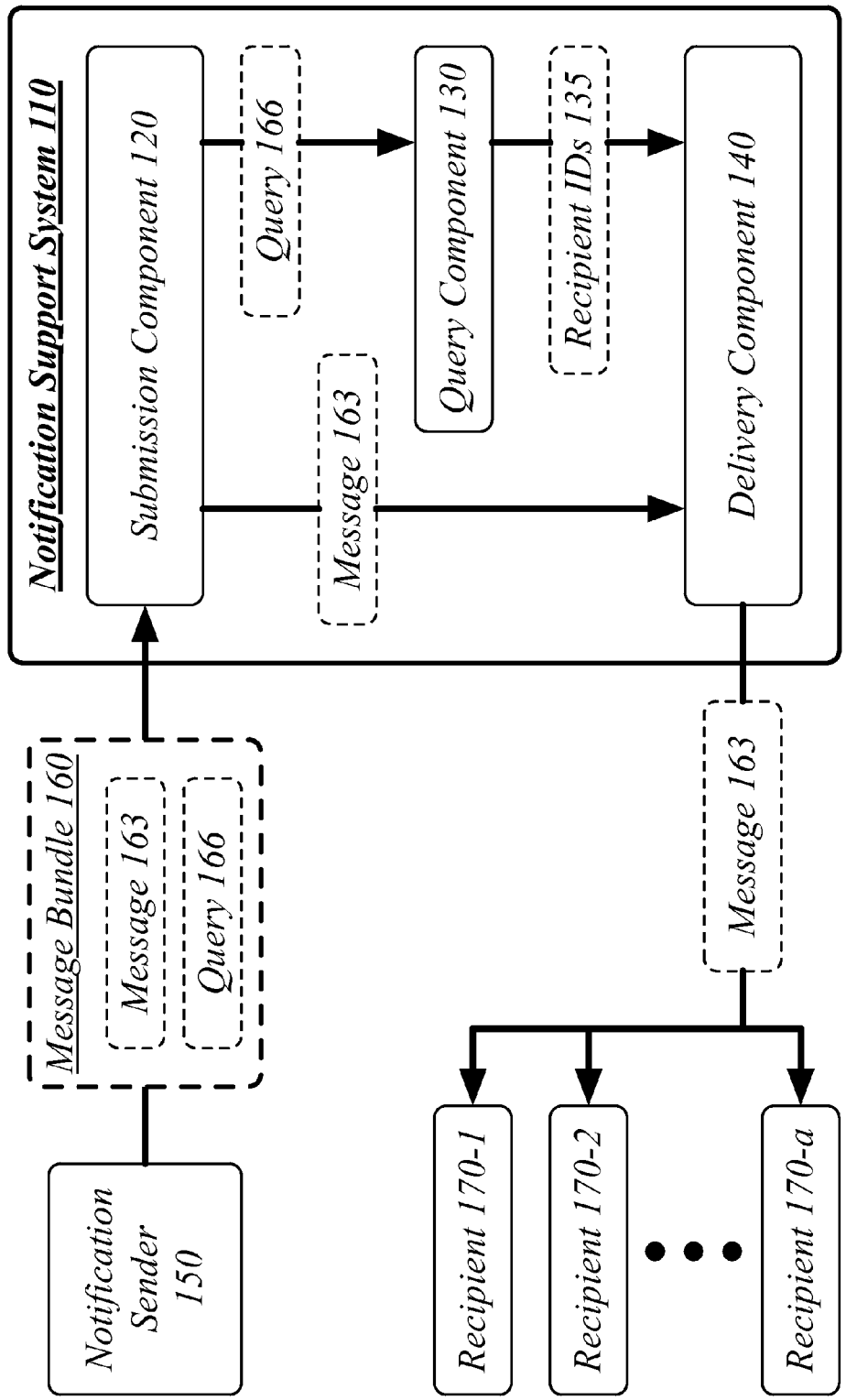
FIG. 1 illustrates an embodiment of a notification support system.

Various embodiments are directed to techniques to generate mass push notifications. A ubiquitous Internet has increased the value of frequently sending small messages to computers, particularly mobile devices. A user might desire to be notified immediately of a piece of news, of a development in an athletic event, of an update to a piece of software, of a promotional offering, etc. and might be near-constantly available to receive such notification thanks to their smartphone. Smartphones apps are a common destination for notifications, fitting well with the goal of providing smaller, more specialized experiences. A sports app might provide a user with information about games, teams, and sports news and allow the user to subscribe to receive notifications about their favorite teams.

Notifications sent to mobile devices, such as smartphones, may be mediated by the provider of the operating system for the device. For instance, sending a notification to an Android™ device may involve submitting a notification to a Google™ server. Similarly, sending a notification to an iOS™ device may involve submitting a notification to an Apple™ server. In general, sending a notification to a mobile device may involve or require submitting the notification to a notification service which in turn transmits the notification to the device. Even for devices which allow apps to open general Internet connections, a notification service mediating all notifications sent to a device may aid users by reducing the incidences in which the device is activated to handle a notification. Notifications to any type of device are often handled as push notifications, where the service reaches out to the device over a communications network to deliver the message instead of waiting for the device to check for and retrieve the message. Because activating a device may involve transitioning the device to a higher-energy state, consuming potentially limited resources, users may be benefited by having this service be mediated by a trusted intermediary who can ensure that, for instance, devices will only be activated by notifications for applications approved by the user to receive notifications.

These notification services may limit the functionality they provide in the API for submitting notifications in order to manage the load a notification submission can place on their servers. For instance, a large number of users may register their devices to receive updates about a particular sports team on a smartphone app. The smartphone application developer may run a server which they use to perform the submission of notifications for subscribed users. However, the notification service may require that the developer server perform an individual submission via a distinct transaction with a notification server for each notification to be sent to a device. By doing so, the notification service may ensure that the amount of work used for any one submitted notification is limited to a known amount, easing the process of provisioning and balancing the resources used for handling notifications.

Notification services attempting to limit the demands placed on them results in an increased burden placed on those who wish to submit notifications, such as application developers. Application developers may therefore benefit from assistance in submitting notifications which takes the burden off of them. Smartphones providing a platform for smaller, more focused applications has created a market open to smaller developers, who may possess sufficient resources to develop the app but be strained by the processing and network resources requires to perform mass submission of notifications. Some applications in which large number of users subscribe to receive the same information (e.g. news, software updates, promotions) may have long periods of very low workload and brief, intermittent periods of very high workload. For instance, a football news app might send out a very large number of notifications at the conclusion of every professional football game, but a relatively small number of notifications at most other times. A developer purchasing sufficient resources to handle the periods of heavy workload may have to commit more financially than if they could share resources with other developers who might also have similar intermittent needs.

While some developers might have their needs met by generalized hosting services, others may benefit by more specialized services which may offer support specific to handling notification submission. Alternatively, some developers might be benefited by generalized hosting services which also provide support specific to submitting notifications. Further, not all notifications are submitted by the developer of an application. Instead, user applications may also be used. For instance, a chat room app on a mobile device may be run through a notification service, where each message submitted to the chat room is broadcast as a notification to all the other participants in the chat room. Mobile devices may be highly limited in their ability to open network sockets for Internet communications and may therefore struggle to send notifications to a large number of recipients. Further, some notification services may limit the entities to which they grant permission to submit notifications. They may require registration, authentication, or access to security tokens which either can't be granted to client devices such as mobile devices or may be impractical to grant to such client devices. As such, a support system which can be so registered, authenticated, or have access to the relevant security tokens may allow for the submission of notifications by client devices.

A notification support system, which may exist independently or as part of a generalized hosting service, may therefore be useful. The notification support system may reduce the workload on a developer server, mobile device, or any other device used for submitting notifications by handling the mass submission of notifications. Most basically, the notification support system may allow for a single submission which includes a notification message and multiple identifiers indicating destination devices, with the notification message to be sent to all of the identified destination devices.

However, a notification support system may provide more comprehensive support by allowing for complex submissions that require more extensive processing by the support system before transmission to the destination devices. The notification support system may host a plurality of recipient records which contain information about each of the potential recipients supported by the system. Each user of a particular app may have a record with the system which may be used in complex submissions of notifications. For instance, for a sports app each user may have a record including which teams they wish to receive notifications about. A developer may therefore be able to make a notification submission indicating that a message (e.g. "Steelers win versus Browns 24 to 3") should be sent to every user whose associated record indicates a subscription to either the Pittsburgh Steelers or the Cleveland Browns. In general, the notification support system may provide an API for the submission of a message bundle comprising a message and a query, where the query is evaluated against the recipient records to determine matching recipients and the message is transmitted to each of the matching recipients.

By providing assistance to a diverse group of applications, the notification support system may share the resources used to perform the submissions across all of the supported application developers, reducing the cost to each. This cost may be further reduced by efficiently processing the submitted notifications. Because a single submission may spawn as many notifications as the number of users of a given app—which may number in the tens of millions—intelligent scaling may be valuable. Each submission may therefore be divided into a plurality of parallel searches for the query across the recipient records. These parallel searches may be run on different servers to improve performance. The number of parallel searches spawned may be scaled with the number of users of the recipient application as the scope of the search problem may scale with the number of recipient records to be searched.

Application developers may therefore be benefited by an efficiently scaling notification support system. As a result, the embodiments can improve the affordability and scalability of developing an application which makes use of push notifications.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates an operating environment 100 for a notification support system 110. In one embodiment, notification support system 110 may comprise a computer-implemented notification support system 110 having a software application 120 comprising one or more components 122-a. Although the notification support system 110 shown in FIG. 1 has a limited number of elements in a certain topology, it may be appreciated that the notification support system 110 may include more or less elements in alternate topologies as desired for a given implementation.

It is worthy to note that "a" and "b" and "c" and similar designators as used herein are intended to be variables representing any positive integer. Thus, for example, if an implementation sets a value for a=5, then a complete set of components 122-a may include components 122-1, 122-2, 122-3, 122-4 and 122-5. The embodiments are not limited in this context.

The notification support system 110 may be generally arranged to handle the delivery of notifications based on complex queries that leverage information stored in recipient records. The notification support system 110 may comprise a submission component 120, a query component 130, and a delivery component 140. The submission component 120 may be operative to receive a message bundle, the message bundle 160 comprising a message 163 and a query 166. The query component 130 may be operative to compare the query 166 to a plurality of recipient records to determine a plurality of recipients 170. The delivery component 140 may be operative to broadcast the message 163 to the plurality of recipients 170.

The submission component 120 may be operative to receive a message bundle, the message bundle 160 comprising a message 163 and a query 166. A bundle may comprise a pair, set, union, or other collection of data received in a single transaction or communication session. For instance, if the message bundle 160 is received using the Transmission Control Protocol/Internet Protocol (TCP/IP) network protocol then the message bundle 160 may be received as part of the same TCP/IP transaction.

The message 163 may comprise any type of message. For instance, the message 163 may comprise a portion of text, an image, a video, a sound, a piece of data, or any combination thereof such as an image accompanied by text. The message 163 may include specialized data for the eventual recipients 170 of the message 163. For instance, the message 163 may include data indicating that a recipient application installed a device should display a badge (a small icon adorning an app in an app-browsing portion of the interface of a mobile device) to indicate the receipt of the message 163. The query 166 may comprise an encoding of a search to be performed on various recipient records in order to determine the recipients 170 of the message 163. The query 166 may be represented using any known technique for representing a search.

The query component 130 may be operative to compare the query 166 to a plurality of recipient records to determine a plurality of recipients 170. The query component 130 may be operative determine the plurality of recipients 170 as a plurality of recipient IDs 135. Each recipient ID may identify a unique one of the plurality of recipients 170.

The delivery component 140 may be operative to broadcast the message 163 to the plurality of recipients 170. The delivery component 140 may be operative to receive the recipient IDs 135 from the query component 130 and use the recipient IDs 135 to broadcast the message 163 to plurality of recipients 170.

In some embodiments, the delivery component 130 may be operative to recognize that the message 163 contains one or more tags and to replace the one or more tags with information extracted from the recipient records for the recipients 170. A tag may represent a request by the message sender to the notification support system 110 for the delivery component 140 to assist in personalizing the message 163 to its recipient. For instance, a message 163 may contain a tag indicating that it should be replaced with the message recipient's name prior to delivery. As such, given the recognition of one or more tags in a message 163, the delivery component 140 may be operative to extract for each recipient of the plurality of recipients 170 information from their associated recipient record and replace the one or more tags with the extracted information when broadcasting the message 163 to that recipient. A tag may be indicated by any of the known techniques for distinguishing between tags and normal text, such as, but not limited to, XML tags, special leading characters, or special surrounding characters. For instance, if a special leading character '$' is used, a message "Happy Birthday $NAME" may be sent with a query that matches to subscribers with a current day as their birthday, with the delivery message having their name replacing the "$NAME" tag so as to send them a personalized birthday greeting on their birthday. Any information stored in the recipient records may be used as a tag.

Figure 2:
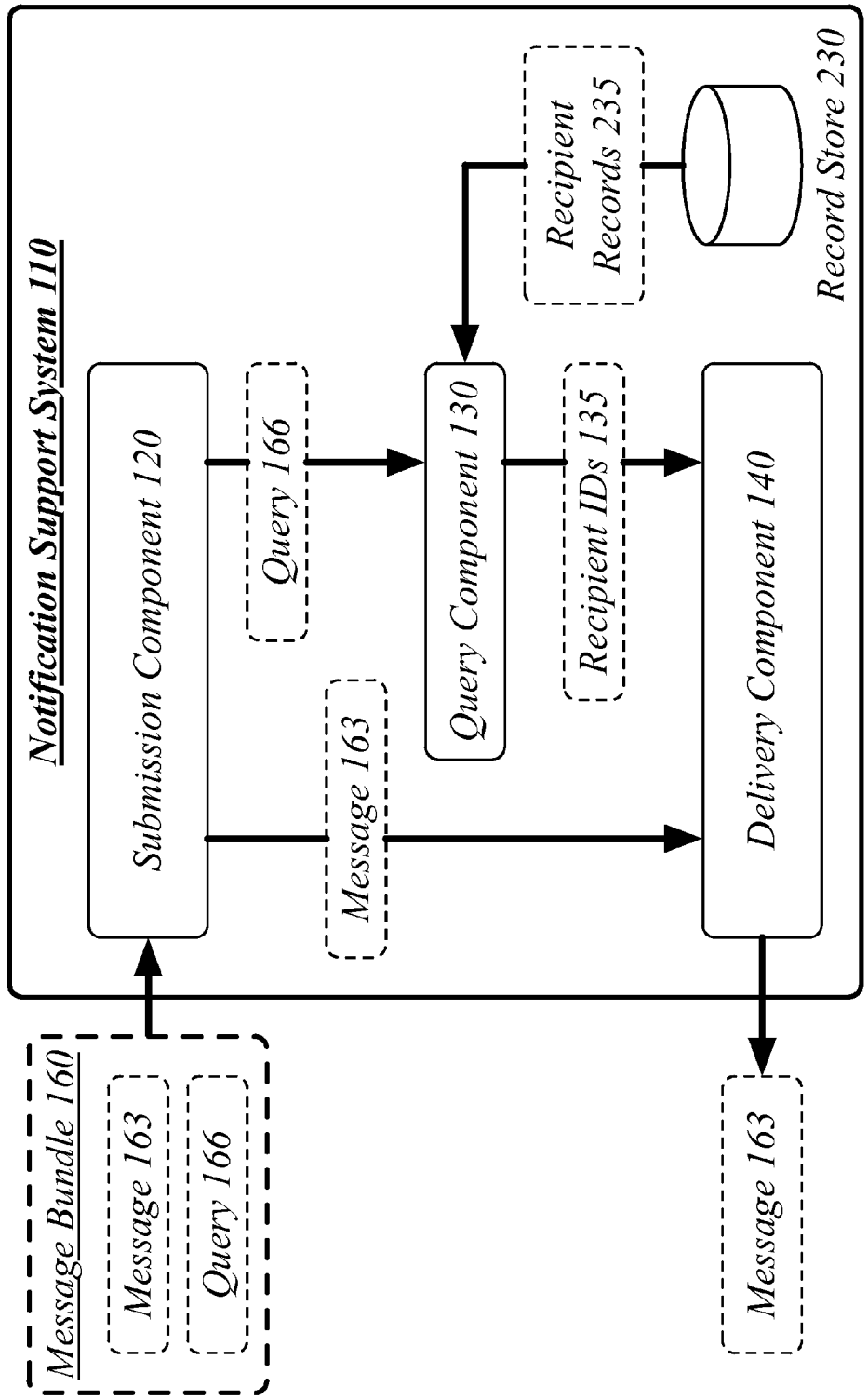
FIG. 2 illustrates an embodiment of the notification support system including a record store.

FIG. 2 illustrates an embodiment of an operational environment 200 for the notification support system 110. As shown in FIG. 2, the notification support system 110 may include a record store 230.

The record store 230 may comprise a database, a database server, a plurality of database servers, a file store, or any other mechanism for storing records. Each potential recipient may have a record, such as a tuple or database row, in the record store 230. The record for each potential recipient may store the recipient ID for that recipient. The query component 130 may operative to compare the query 166 to the plurality of recipient records 235 to determine a plurality of recipient records matching the query 166. For instance, if the query 166 specifies that the associated message 163 should be sent to any recipient with a record containing a certain tag, identifier, term, subscription, or other element, the query component 130 may be operative to compare the query 166 to the plurality of recipient records 235 to determine those records which contain the element and include the recipient ID stored in the record with the recipient IDs 135 forwarded to the delivery component 140.

The record store 230 may comprise a relational database. It will be appreciated that a relational database may be implemented as a standalone database, as a network-accessible database, as a distributed database on multiple servers, or using any other technique of implementing a relational database. The query 166 may comprise a relational query empowered to search based on any individual field of the record store 230 or any fields of the record store 230 in combination. The query 166 may specify that a certain search term should be present in a matching record, should be absent in a matching record, or that multiple terms should be present or absent in any combination. More complex elements may be used in queries as well. For instance, a record for a particular recipient may specify a geographical location and a query may specify a range of geographical locations which should be matched, such as an area.

Each application supported by the notification support system 110 may have defined for it a set of fields for all of the recipient records for installed instances of that application. For instance, a football app may have the specified set of fields: installed application version, user language, subscribed team, subscribed conference, and playoff news. The query component 160 may be operative to perform searches over any and all of the fields for the app to identify matching recipients. Some fields may always contain an entry, such as application version or user language, some fields may be binary toggles, such as whether or not a user wants to receive anything tagged as playoff news, and some fields may allow for no entries, a single entry, or multiple entries, such as allowing a user to specify zero, one, or more than one subscribed team or conference. This defined set of fields may be determined by the application developer and submitted to the notification support system 110 as part of registration of the application with the notification support system 110. This defined set of fields may be modified by the application developer, such as to allow for the use of new fields in new versions of the application.

Figure 3:
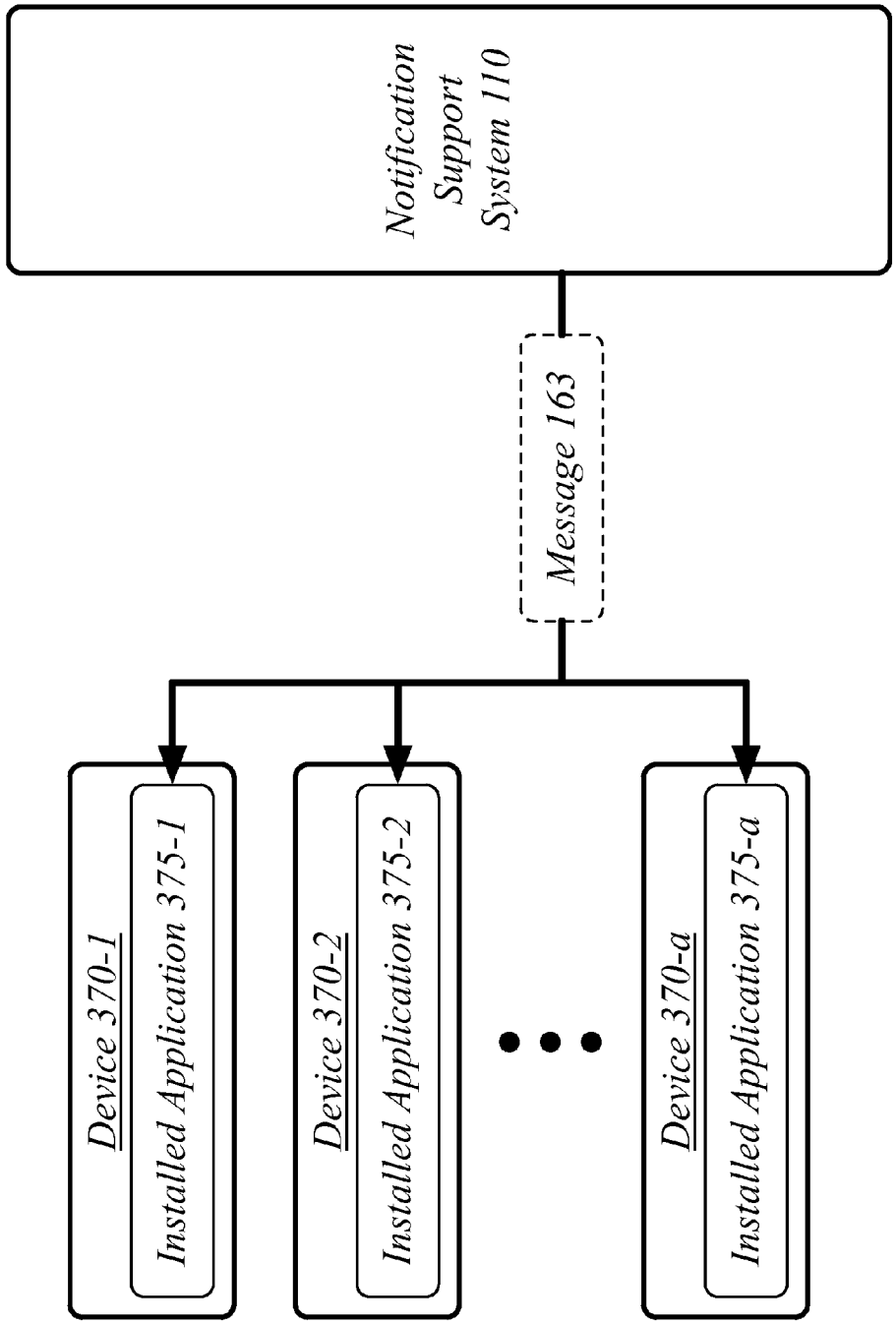
FIG. 3 illustrates an embodiment of the notification support system in which the recipients are installed applications on devices.

FIG. 3 illustrates an embodiment of an operational environment 300 for the notification support system 110. As shown in FIG. 3, the message 163 may ultimately be sent to an installed application on a device.

A computing device may be operative to receive notifications on behalf of applications installed on it. For example, a user may install a sports app on a mobile device for the purpose of retrieving and viewing sports information and for receiving notifications about relevant sports news. In general, a particular application may have a plurality of instances as a plurality of installed applications 375 on a plurality of devices 370. The notification support system 110 may provide notification support for a plurality of particular applications, each of which may have a plurality of instances of installations of that application on a plurality of devices.

Each of the plurality of recipient records may correspond to an installation of a particular application onto a particular device. Each installed application may have its own associated recipient record. As such, each individual installed application on each individual device may have its own unique recipient ID. If a another, distinct application is installed on a device and make use of the notification support system 110 each of the instances of its installation may have its own recipient record distinct from the recipient record for the other application installed on the device.

The query 166 may therefore specify which application of the plurality of applications the query 166 should be used with. This specification of an application may refer to specifying the general application, for instance the sports app as a whole, rather than the individual installations of the application the identifiers for which will be the result of the search performed on the recipient records 235. The query component 140 may therefore be operative to include an identifier for the application as part of the query of the recipient records 235, to only search those recipient records which correspond to the application, or otherwise ensure that only recipient records that are associated with that application have their recipient ID included in the recipient IDs 135 sent to the delivery component 140.

The delivery component 140 may then be operative to broadcast the message 163 to the plurality of installed applications 375 that correspond to the plurality of recipient records matching the query 166. Each of these installed applications 375 may be installed instances of the same application. It will be appreciated that a given application may have multiple versions and that, as such, the plurality of installed applications 375 may include various versions of the application. The notification support system 110 may be useful in notifying users of a new version. For instance, if the recipient records associated with installations of a particular application include the installed version of the application, then a message 163 could be sent with a query 166 indicating all versions other than the new version so that the message 163— which may indicate the availability of the new version— would be received by all and only those recipients who haven't yet updated to the new version.

Figure 4:
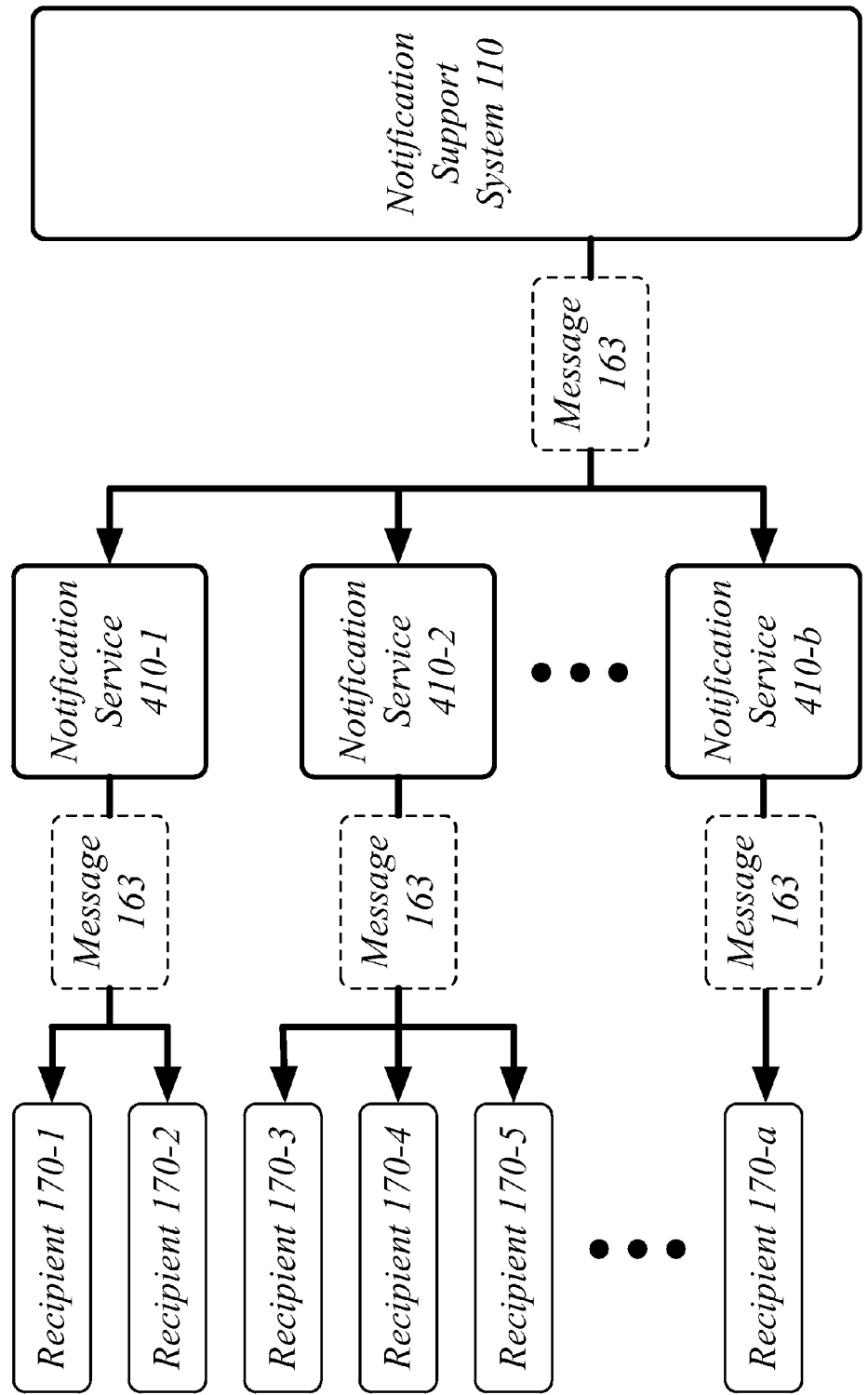
FIG. 4 illustrates an embodiment of the notification support system in which the messages are sent as notifications through notification services.

FIG. 4 illustrates an embodiment of an operational environment 400 for the notification support system 110. As shown in FIG. 4, the notification support system 110 may broadcast the message 163 to the plurality of recipients 170 using a plurality of notification services 410.

A notification service may comprise an intermediary service used to mediate between senders of notifications and receivers of notifications. Submitting a notification to a notification service may comprise sending the service a message, such as message 163, and an identifier to indicate the recipient. In some embodiments, the identifier to indicate the recipient may comprise one of the recipient IDs 135 retrieved by the query component 130 and forwarded to the delivery component 140. In some embodiments, the delivery component 140 may authenticate with a notification service to prove itself an authenticated submitter of message. This may involve the delivery component 140 submitting credentials to indicate that it is authorized to act as an agent of an application or developer.

As such, the delivery component 140 may be operative to submit a plurality of notifications to the notification services 410 wherein one notification is submitted for each of the plurality of recipients 170. The delivery component 140 may be operative to submit each of the plurality of notifications to one of the plurality of notification services 410 according to which notification service is responsible for mediating notifications with each recipient. Where each recipient is an installed application, the delivery component 140 may therefore be operative to broadcast the message 163 to the plurality of installed applications 375 by submitting the plurality of notifications to the one or more notification services 410, each of the plurality of notifications corresponding to one of the plurality of installed applications 375.

In some embodiments, the delivery component 140 may receive information during the broadcast to a device that can be used to update the recipient record for a recipient. This information may either be received directly by the notification support system 110 from a destination device or may be received from an intermediary notification service. For instance, data retrieved to empower the delivery of a message 163 to a device connected to a cellular network may allow for an update to be made to the current location of a device based on the current cellular site the device is connected to. Similarly, in the case of a failed delivery attempt, the recipient record for an installed application may be updated to indicate an earliest time when the associated device was unavailable. This unavailability entry may be cleared if the device is later reached. In some embodiments, a device which has been unavailable for longer than a predefined period of time may be automatically removed from eligibility from receiving any messages. In general, any information determined, retrieved, or received during a direct delivery attempt or delivery attempt through an intermediary may be used to update a recipient record for the attempted recipient.

Figure 5:
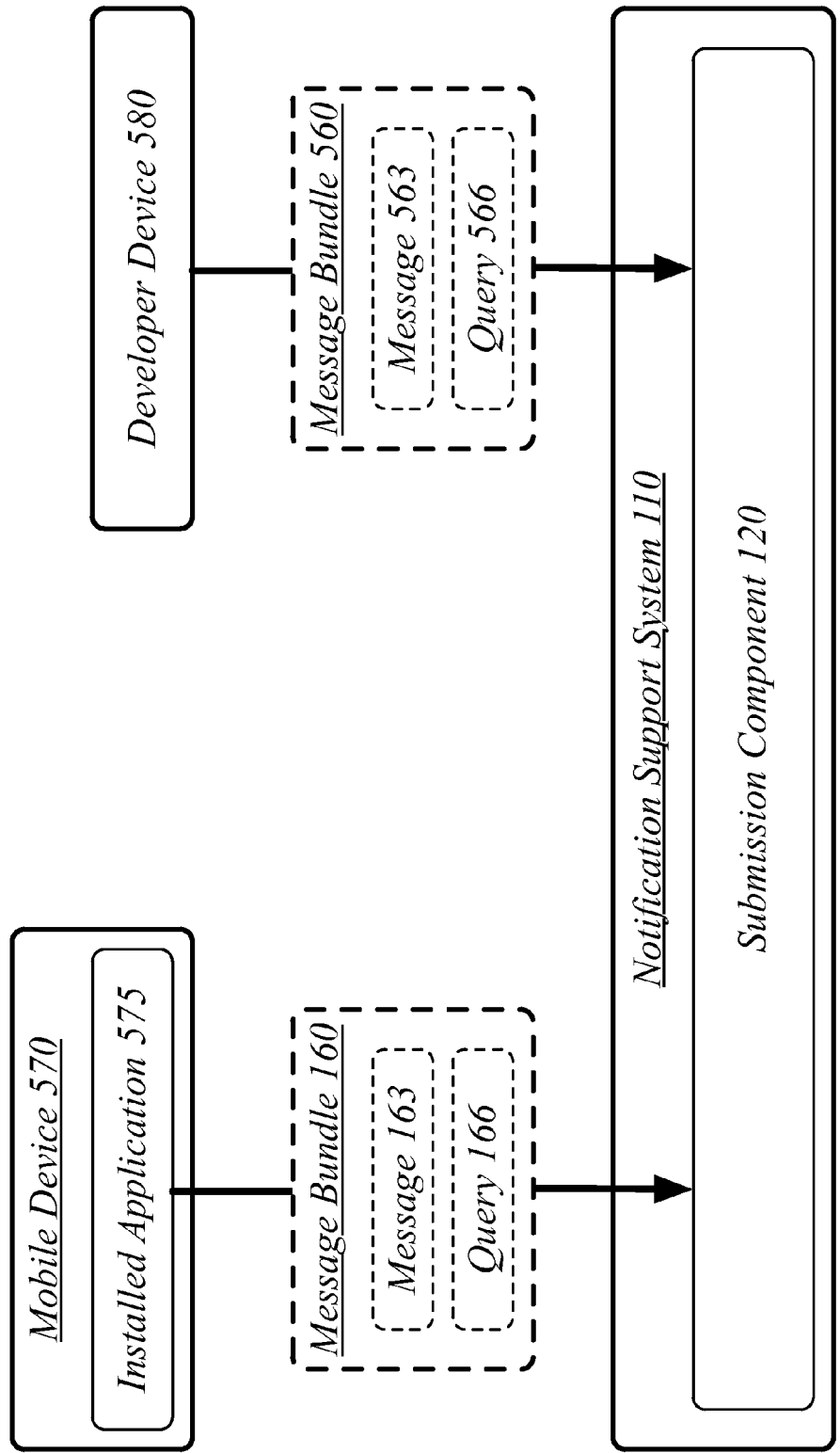
FIG. 5 illustrates an embodiment of the notification support system in which message bundles are received from both mobile devices and developer devices.

FIG. 5 illustrates an embodiment of an operational environment 500 for the notification support system 110. As shown in FIG. 5, the notification support system 110 may be operative to receive message bundles from both mobile devices and from developer devices.

In some use cases, it may primarily be developers that generate the messages for distribution by the notification support system 110. In other uses cases, for some applications, it may primarily be users of that application which generate the message for distribution by the notification supports system 110. For example, for a sports app it may primarily be the developers which generate messages updating users about sports news. In another example, for a chat app it may primarily be users of that chat app which generate messages comprising the chat sent from one user to another. And in another example there may be a mix of senders, such as with a social networking app where the social networking service may send notifications to users about relevant social networking events, but where there also may be user-to-user notifications for such things as social-networking based chat.

As such, the submission component 120 may be operative to receive a message bundle 160 from an installed application 575 on a mobile device 570. The installed application 575 may comprise an installed instance of an application supported by the notification support system 110. The installed application 575 may itself have a recipient record in the plurality of recipient records 235 in the record store 230. Depending on the nature of the query 166, the installed application 575 may therefore be one of the recipients 170 or may not included in the recipients 170. The installed application 575 may comprise a user application wherein the sending of message 163 is initiated on the behalf of a request by a user of mobile device 570.

Similarly, the submission component 120 may be operative to receive a message bundle 560 from a developer device 580. The message bundle 560 may comprise a message 563 and query 566. The submission component 120 may be operative to receive the message bundle 560 over a developer user-notification interface for use by developers in transmitting notifications to users of their application. If the message 563 is intended for a plurality of installed applications 375 the message bundle 560 may be received from the developer of the application. In some embodiments, the submission component 120 may be operative to verify the identity of an application developer prior to receiving message bundle 560 to determine that the application installed on the plurality of devices 370 was developed by or otherwise is controlled by the submitter. The submission component 120 may be operative to only accept a message bundle 560 via a developer interface from an authenticated developer of the application to which the notification is targeted. This may be accomplished by any known technique for authenticating a sender, include secure login, security tokens, and public/private key authentication.

Figure 6:
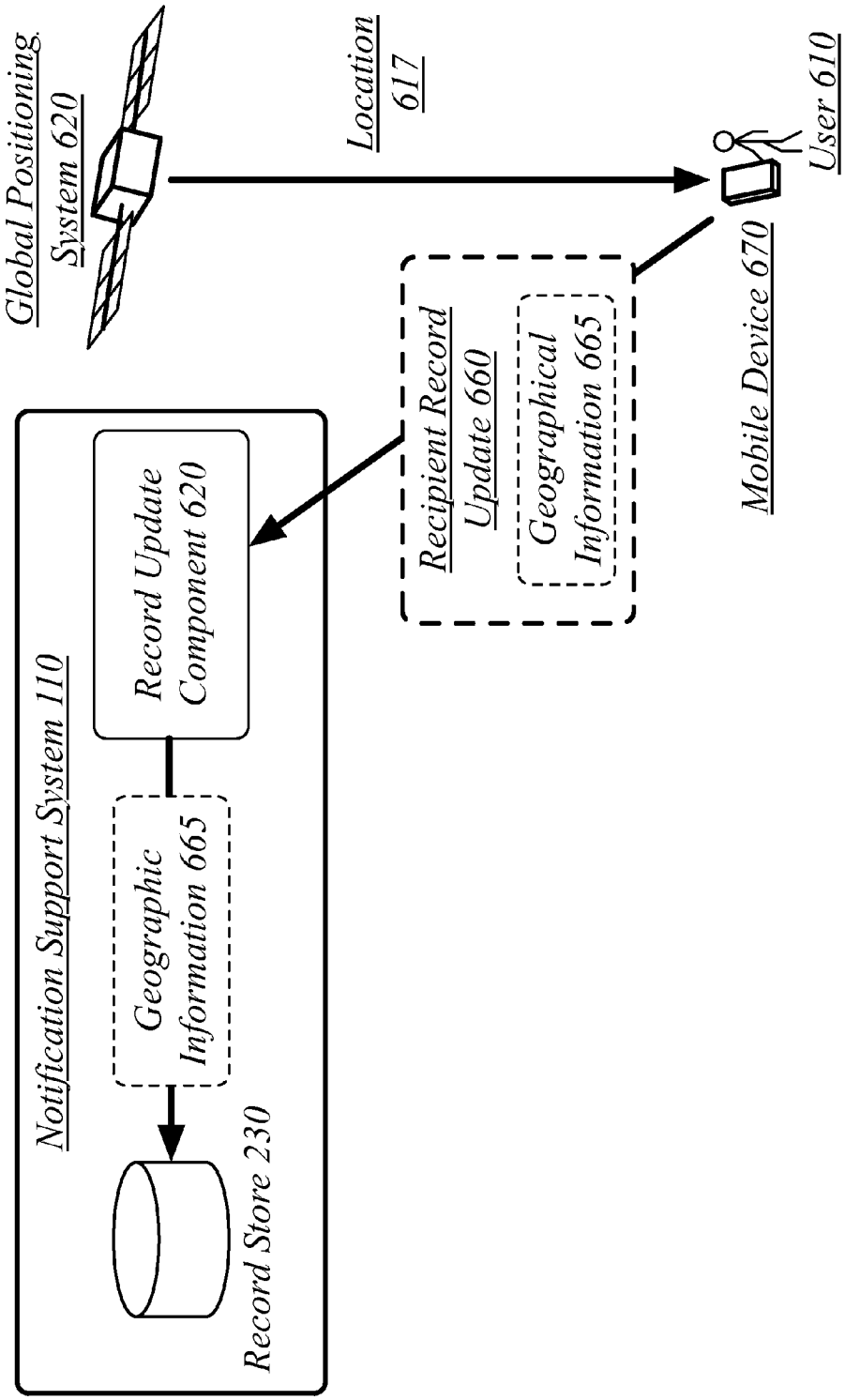
FIG. 6 illustrates an embodiment of the notification support system in which a mobile device submits its current location.

FIG. 6 illustrates an embodiment of an operational environment 600 for the notification support system 110. As shown in FIG. 6, a record update component 620 may be operative to accept a recipient record update 660.

The record update component 620 may be generally operative to receive a recipient record update 660 from a mobile device 670 and to store information from the recipient record update 660 in the record store 230. The record update component 620 may be operative to receive the recipient record update 660 from a mobile device 670, to verify that the recipient record update 660 was received from an installed application that is an instance of an application supported by the notification support system 110, and to store information from the recipient record update 660 in association with a recipient ID uniquely identifying the installed application on mobile device 670 that submitted the recipient record update 660. Where an application supported by the notification support system 110 has a defined set of fields, the record update component 620 may be operative to reject any recipient record update 660 or any portion of a recipient record update 660 which does not match with the predefined fields.

A recipient record update 660 may comprise an initial creation of a recipient record for a particular application installation on a mobile device 670. An installed application may submit an initial recipient record update 660 upon installation by user 610 in order to establish an initial record of the existence of the installed application. This initial recipient record update 660 may be submitted prior to the user of the installed application selecting any user-specific notification subscriptions. This may make the newly-installed application available to receive general-notice notifications sent to all users of the application. This may also make the newly-installed application available to receive notifications directed to fields of a recipient record that may be automatically determined by the installed application, such as the current version of the installed application, the current operating system of the mobile device 670, the current operating system version of the mobile device 670, the cellular carrier of the mobile device 670, or the default language setting for the mobile device 670. Alternatively, the installed application may refrain from submitting a recipient record update 660 until the user 610 of the installed application requests a notification subscription, such as to a particular sports team, news topic, chat room, or any other possible subscription. The installed application may be operative to submit any automatically-determined fields along with a recipient record update 660 spawned from a user-request subscription.

A recipient record update 660 may comprise a change, addition, or other modification to the recipient record associated with an installed application on the mobile device 670. The recipient record update 660 may comprise the addition of an entry to a particular field of the recipient record for an installed application, the removal of an entry from a particular field of the recipient record for an installed application, or change to an entry from a particular field of the recipient record for an installed application. In some embodiments, a recipient record update 660 may contain piecemeal updates, such that the recipient record update 660 only specifies modifications to the recipient record for an installed application. Alternatively, a recipient record update 660 may comprise a complete replacement of the recipient record for an installed application, such that each submitted recipient record update 660 completely replaces the recipient record for the installed application.

The recipient record update 660 may comprise geographical information 665 for the mobile device 670. A mobile device 670 may be operative to determine its current location, such as by using the global positioning system 620, by using Wi-Fi-based positioning, or by any other known technique of determining position, or by any combination of known techniques for determining position. The submitted geographical information 665 may comprise the current location of the mobile device 670. The mobile device 670 may be operative to periodically submit its current location to the record update component 620 in order to allow for geographically-based notifications. The mobile device 670 may be operative to submit its current location on a set schedule or dynamically in response to events on the mobile device 670 such as in response device activation, in response to activation of the installed application, or in response to the mobile device 670 determining its location.

The record update component 620 may therefore be operative to receive a recipient record update 660 to geographical information 665 stored in one of the plurality of recipient records from a mobile device 670, the recipient record update comprising a current location of the mobile device 670. A received query 166 may therefore specify a geographical location, the determined plurality of recipients 170 comprising those recipients with recipient records containing geographical information corresponding to the geographical information. It will be appreciated that while the stored geographical information 665 for a mobile device 670 may comprise a specific location, that a query 166 may specify a geographical area wherein any mobile device with stored geographical information within the specified geographical area will match the geographic portion of the query 166. It will also be appreciated that the query 166 may also contain further terms or specifications for which recipient records should be matched and that therefore the attached message 163 may not be sent to every instance of an installed application on a mobile device with geographical information stored in its recipient record within the search area. For example, a "frugal shopping" application may send a promotional advertisement for a particular restaurant to every installed instance of the application within a defined distance of the restaurant where the application has indicated in its recipient record that the user 610 is interested in receiving dining-related promotions. Similarly, a weather application may send a severe storm warning notification to every installed instance of the weather application within the coverage area of the severe storm warning where the weather application has registered in its associated recipient record to receive notifications for dangerous weather conditions.

The installed application on a device and notification support system 110 may work to protect the privacy of an individual. A user may be required to opt-in or otherwise grant permission before any potentially-private information is submitted to the record store 230. A user may be asked whether they wish to grant permission to the application to periodically submit the user's current location to the service. Further, the notification support system 110 may restrict senders, including developers, from extracting information from the record store 230. While they may be empowered to submit a query 166 with a message 163 for matching against the record store 230 to determine recipients 170, they may not be empowered to directly access or withdraw information stored in the record store 230. As location information may be particularly sensitive, the notification support system 110 may be operative to prevent senders, including developers, from determining a user's exact geographic location and may limit them to merely matching a geographic area as part of query 166 against the stored locations of users.

Figure 7:
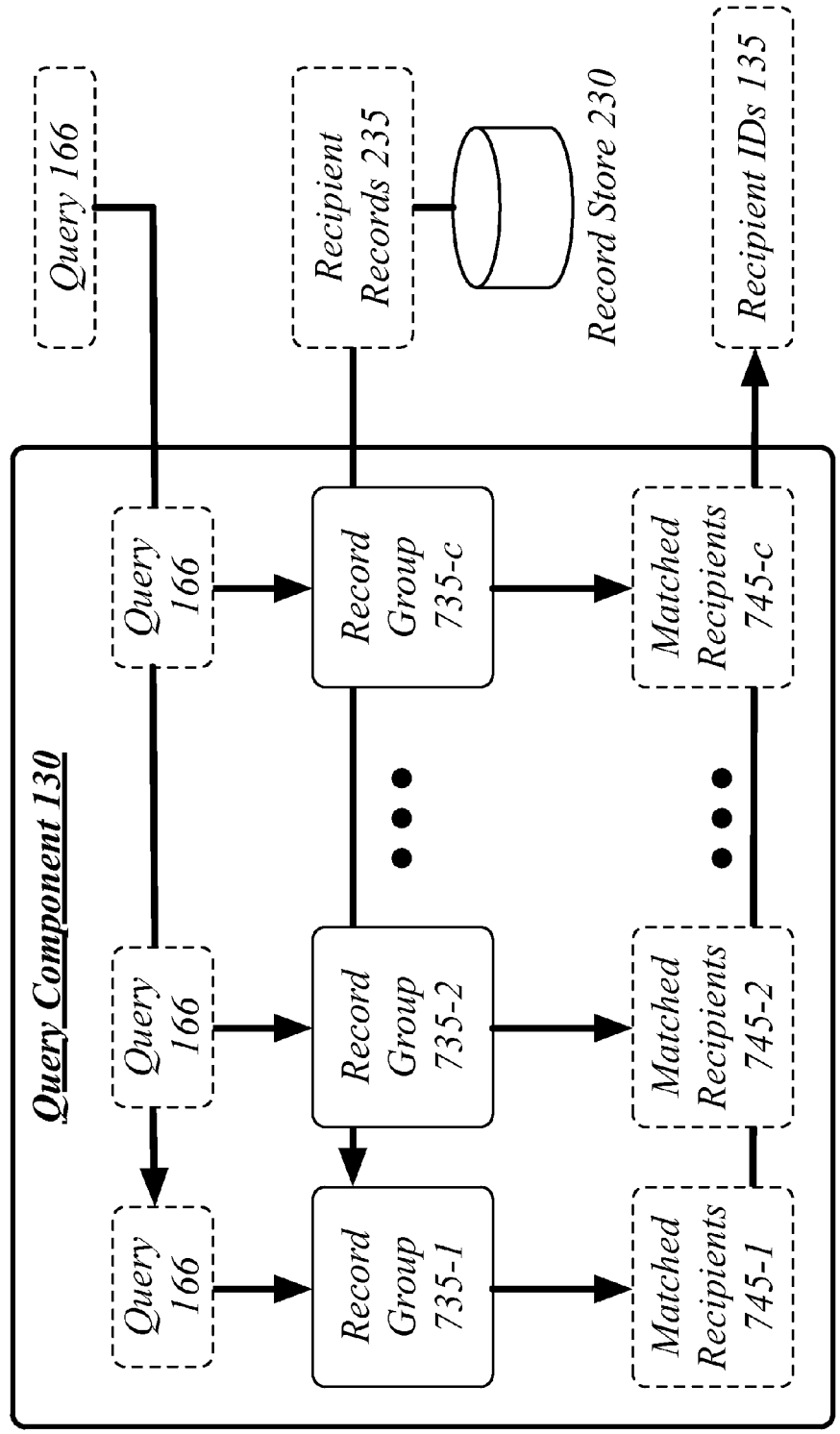
FIG. 7 illustrates an embodiment of the notification support system in which the query component operates in parallel to process a query.

FIG. 7 illustrates an embodiment of an operational environment 700 for the notification support system 110. As shown in FIG. 7, the query component 130 may be operative to process a query 166 in parallel.

Because a single submission may spawn as many notifications as the number of users of a given app, intelligent scaling using parallel searches may increase the efficiency and reduce the amount of time required to process the query 166 for a submitted message bundle 160. The query component 130 may therefore be operative to divide the recipient records 235 for a particular application into a plurality of record groups 735 and to examine each of the plurality of record groups 735 in parallel to determine the plurality of recipients 170. Each of the parallel searches of record groups 735 may produce a set of matched recipients 745 comprising those recipients with recipient records matching the query 166 for each record group 735. Each set of matched recipients 745 may comprise a set of recipient IDs which are combined together to produce the recipient IDs 135 forwarded from the query component 130 to the delivery component 140 for use in broadcasting the message 163 to the recipients 170.

In some embodiments, the query component 130 may be implemented across a plurality of servers or may submit queries to a plurality of servers. Each of the plurality of servers may contain or have access to the complete set of recipient records 235 in the record store 230. By distributing the search across a plurality of servers, the total time used to determine the recipients 170 based on the query 166 may be reduced.

Because the notification support system 110 may be used by a plurality of applications, and because spawning a search on a server and collating results from multiple servers each use more processing time the more servers are used, it may not be beneficial to always parallelize the search to the maximal possible extent. Instead, the search may be parallelized in scale to the scope of the search. The scope of the search may scale by the number of total installations of the particular application of which the recipient applications are instances thereof. Therefore, the number of recipient groups 735 may be determined according to the quantity of total installations of that application. Consequently, the query component 130 may be operative to divide the plurality of recipient records 235 into a plurality of record groups 735, the particular number of record groups 735 based on the quantity of total installations of the particular application the message 163 is to be sent to. In some embodiments, the notification support system 110 may divide the quantity of total installations by a pre-defined constant to determine the number of parallel searches, wherein the number of parallel searches may be the number of individual database servers tasked with performing the query 166. In some embodiments the division may use a dynamically-calculated variable based on the current load on the notification support system 110. In some embodiments a non-linear scaling may be used according to any of the known techniques for load balancing across parallel servers.

In some embodiments, each recipient record may be assigned a parallelization constant used to divide the recipient records 235 into the record groups 735. In some embodiments, the parallelization constant may be unique across all application install instances of all applications supported by the notification support system 110. In alternative embodiments, the parallelization constant may merely be unique across all application install instances of each application with duplication allowed between instances of different applications. In other alternative embodiments, the parallelization constants may not be unique but may be randomly generated across a wide enough range of numbers to be unique for the vast majority of installed applications.

The parallelization constant for a recipient record may be generated at the time the recipient record is created. The parallelization constant may be randomly generated according to any known random or pseudo-random number generation technique. The parallelization constant may be selected according to a uniform distribution of random numbers so as to uniformly distribute the generated parallelization constants across the space of possible constants.

Dividing the plurality of recipient records 235 into record groups 735 may comprise dividing the space of possible constants into contiguous subspaces of equal size. For example, if the space of possible constants is the full range of 32 bit integers and 100 record groups are to be generated, the range of possible 32 bit integers may be divided into 100 groups of equal size. The ranges may alternatively be of near-equal size to accommodate a number of record groups which isn't a whole number divisor of the number of possible parallelization constants. Because the parallelization constants were assigned according to a uniform distribution, each subspace of the range should contain an approximately equal number of records and therefore represent approximately the same amount of work to search. Each parallel search may therefore be assigned a particular range and may examine each recipient record assigned to a particular application with a parallelization constant that falls within that range.

The query component 130 may be operative to oversee the parallel searches. The query component 130 may be operative to restart any searches which may fail. For instance, a database server may experience an error resulting in a failure to examine its portion of the search space. The query component 130 may be operative to detect this failure and to re-task the same server or to task a new server with searching that portion of the search space. Similarly, the query component 130 may be operative to determine that a database server has failed to respond within an expected response time and may be operative to initiate a second search of the same search space assigned to that server and to use the results from whichever server returns first.

The delivery component 140 may be operative to initiate transmission of the message 163 to the recipients 170 as soon as any set of matched recipients 745 is returned by a database server. This may serve to reduce the amount of time between when the message bundle 160 is received and notifications are begun to be broadcast. The delivery component 140 may also be implemented using parallel techniques and may assign each set of matched recipients 745 to one of a plurality of servers used for broadcasting notifications.

Figure 8:
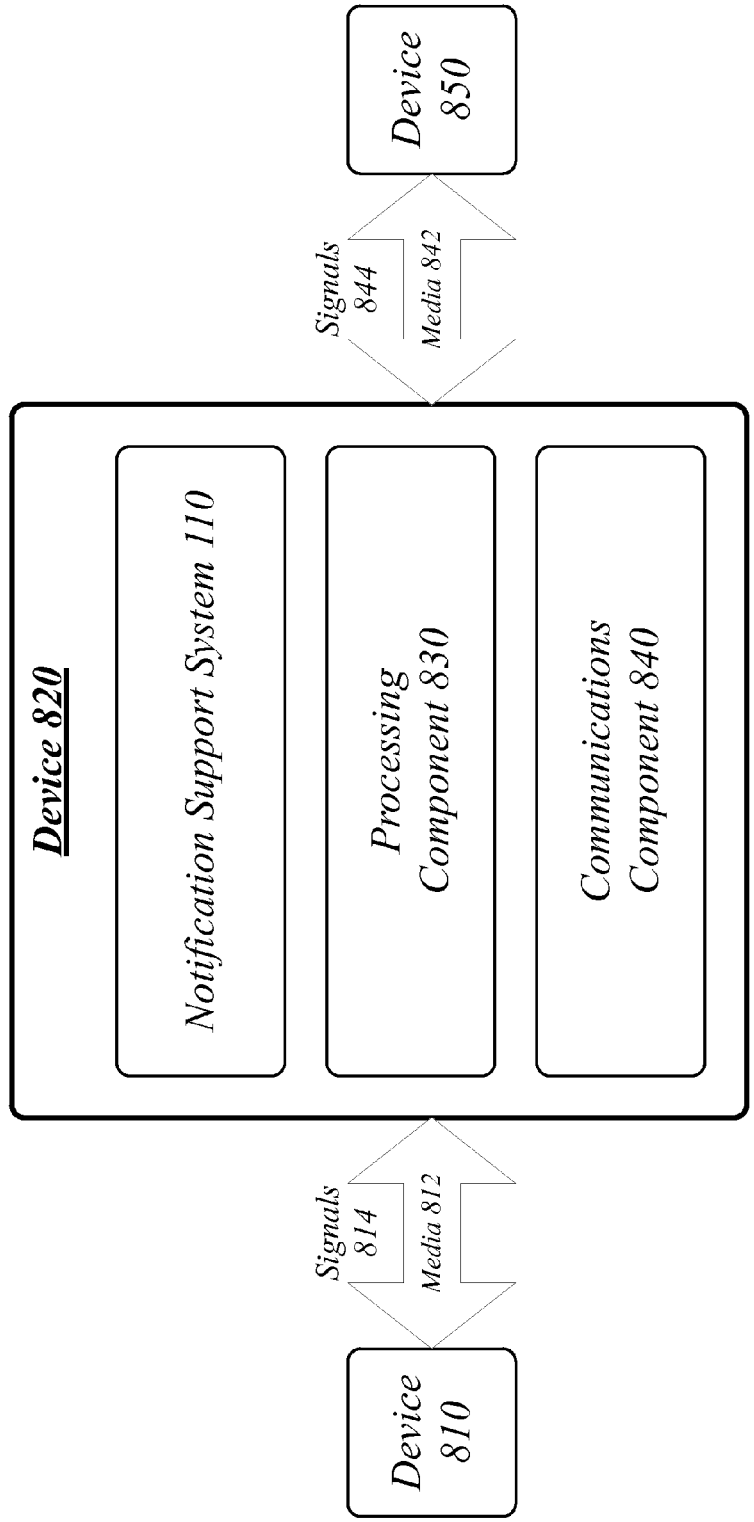
FIG. 8 illustrates an embodiment of a centralized system for the notification support system of FIG. 1.

FIG. 8 illustrates a block diagram of a centralized system 800. The centralized system 800 may implement some or all of the structure and/or operations for the notification support system 110 in a single computing entity, such as entirely within a single device 820.

The device 820 may comprise any electronic device capable of receiving, processing, and sending information for the notification support system 110. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 820 may execute processing operations or logic for the notification support system 110 using a processing component 830. The processing component 830 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 820 may execute communications operations or logic for the notification support system 110 using communications component 840. The communications component 840 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 840 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 812, 842 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 820 may communicate with other devices 810, 850 over a communications media 812, 842, respectively, using communications signals 814, 844, respectively, via the communications component 840. The devices 810, 850 may be internal or external to the device 820 as desired for a given implementation.

Device 810 may comprise a mobile device used by a user of an application supported by the notification support system 110. Device 810 may comprise a mobile device used to submit a notification, such as mobile device 570, wherein communications signals 814 sent over communications media 812 may comprise the transmission of message bundle 160 from mobile device 570 to the submission component 120. Device 810 may comprise a mobile device submitting an update to its associated recipient record, such as mobile device 670, wherein communications signals 814 sent over communications media 812 may comprise the transmission of recipient record update 660 from mobile device 670 to the record update component 620. Device 810 may comprise a device receiving a notification, such as device 370-1, wherein communications signals 814 sent over communications media 812 may comprise the transmission of message 163 from delivery component 140 to the mobile device 370-1.

Device 850 may comprise a device used by a developer of an application supported by the notification support system 110. Device 850 may comprise a device used to register an application to the notification support system 110, wherein communications signals 844 sent over communications media 842 may comprise the transmission of registration information from device 850 to the notification support system 110. Device 850 may comprise a device used by a developer to submit a notification for distribution to users of the developer's application, such as developer device 580, wherein communications signals 814 sent over communications media 812 may comprise the transmission of message bundle 560 from developer device 580 to the submission component 120.

Figure 9:
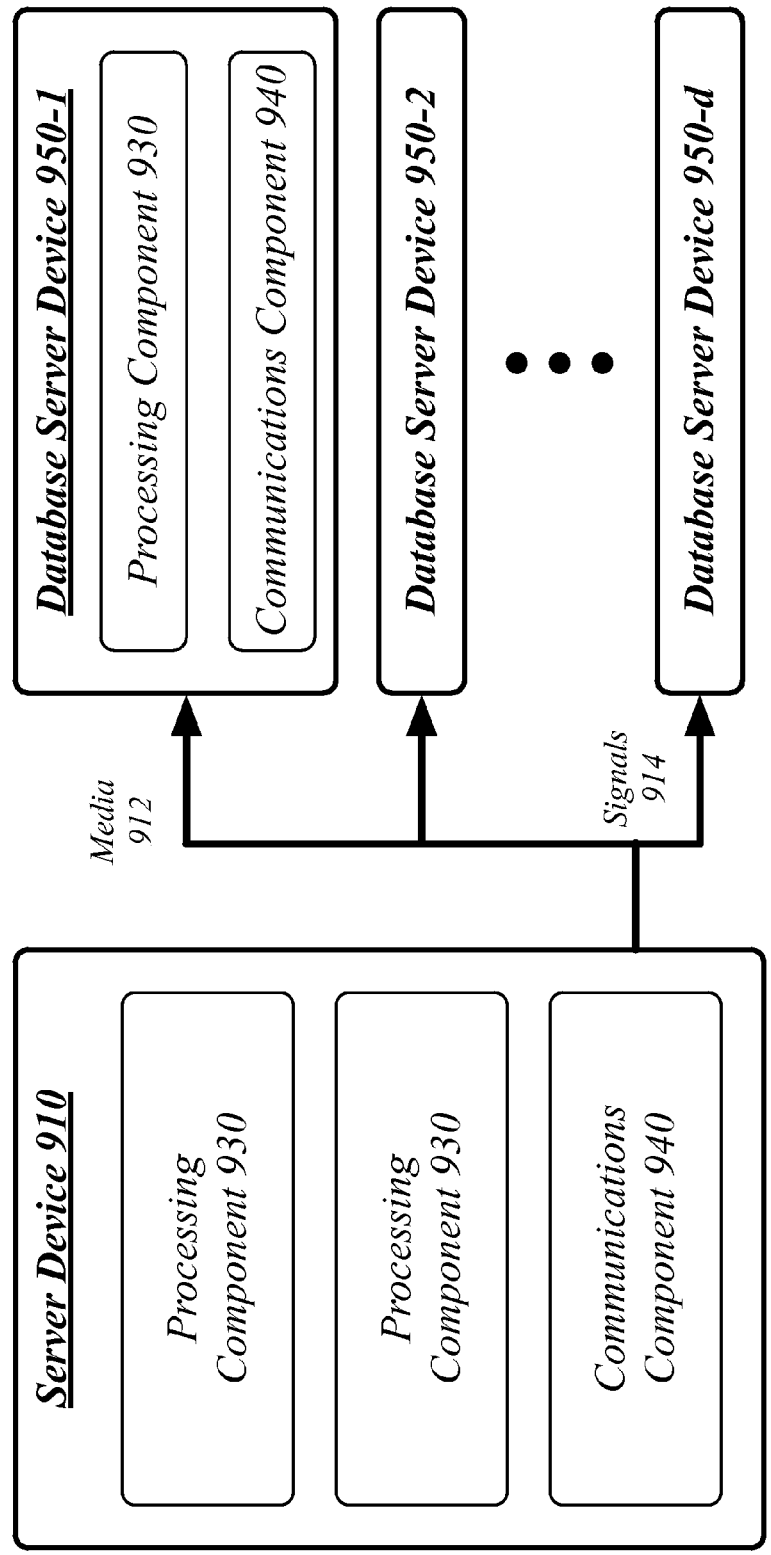
FIG. 9 illustrates an embodiment of a distributed system for the notification support system of FIG. 1.

FIG. 9 illustrates a block diagram of a distributed system 900. The distributed system 900 may distribute portions of the structure and/or operations for the notification support system 110 across multiple computing entities. Examples of distributed system 900 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 900 may comprise a server device 910 and a plurality of database server devices 950. In general, the server device 910 and the database server devices 950 may be the same or similar to the client device 820 as described with reference to FIG. 8. For instance, the server device 910 and the database server devices 950 may each comprise a processing component 930 and a communications component 940 which are the same or similar to the processing component 830 and the communications component 840, respectively, as described with reference to FIG. 8. In another example, the devices 910, 950 may communicate over a communications media 912 using communications signals 914 via the communications components 940.

The server device 910 may comprise or employ one or more client programs that operate to perform various methodologies in accordance with the described embodiments. In one embodiment, for example, the server device 910 may implement the submission component 120, the query component 130, the delivery component 140, and the record update component 620. The database server devices 950 may comprise or employ one or more server programs that operate to perform various methodologies in accordance with the described embodiments. In one embodiment, for example, the database server devices 950 may implement the parallel searches performed on behalf of the query component 130. Signals 914 sent over media 912 may comprise the transmission of a request to perform a search over a particular range of parallelization constants from the query component 130 to the database server devices 950 or to a subset of the database server devices 950 equal to the number of record groups 735.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 10 illustrates one embodiment of a logic flow 1000. The logic flow 1000 may be representative of some or all of the operations executed by one or more embodiments described herein.

In the illustrated embodiment shown in FIG. 10, the logic flow 1000 may, at block 202, receive a message bundle 160, the message bundle 160 comprising a message 163 and a query 166. In some embodiments, the message bundle 160 may received over an application programmer interface (API) for notification support system 110. The message bundle 160 may be encrypted during transmission according to public/private key encryption, shared key encryption, or according to any known encryption technique. The message bundle 160 may be received from an authenticated sender, the sender authenticated using any known technique for authentication.

The message bundle 160 may be placed into a message bundle queue. The message bundle queue may store message bundles which have not yet spawned searches and are awaiting processing by the query component 130. The message bundle queue may comprise a first-in first-out (FIFO) queue, a priority queue, a FIFO queue tiered according to sender priority, or any other form of queue. In some embodiments, senders may be prioritized according to a contractual relationship between the provider of notification support system 110 and developers of applications supported by notification support system 110.

The logic flow 1000 may, at block 1004, compare the query 166 to a plurality of recipient records 235 to determine a plurality of recipients. The recipient records 235 may be stored in a record store 230 which may be duplicated across a plurality of search servers. The recipient records 235 may be searched in parallel by a plurality of search servers. Comparing the query 166 to the recipient records 235 may therefore comprise submitting a plurality of search requests to a plurality of search servers and the search servers performing the search in parallel.

The search servers may each maintain a search queue of submitted search requests. A search queue may store search requests which have been submitted to the search server and are awaiting processing by the search server. Each search server may perform only a single search at a time or may perform multiple searches in parallel. A search server may be operative to dequeue a search request and begin processing the search request when search resources become available on the search server. The search queues may comprise FIFO queues, priority queues, FIFO queues tiered according to sender priority, or any other form of queue.

The logic flow 1000 may, at block 1006, submit a plurality of notifications to one or more notification services, each of the plurality of notifications corresponding to one of the plurality of recipients and comprising the message. The notifications may be submitted to the notification services by a plurality of parallel broadcast servers. Broadcasting the message 163 therefore comprise submitting a plurality of broadcast requests to a plurality of broadcast servers and the broadcast servers performing the submission to notification services in parallel.

The broadcast servers may each maintain a broadcast queue of submitted broadcast requests. A broadcast queue may store broadcast requests which have been submitted to the broadcast server and are awaiting processing by the broadcast server. Each broadcast server may perform multiple parallel submissions to notification services in parallel. A broadcast server may be operative to dequeue a broadcast request and begin broadcasting the one or more notifications when may comprise the broadcast request when network and processing resources become available on the broadcast server. The broadcast queues may comprise FIFO queues, priority queues, FIFO queues tiered according to sender priority, or any other form of queue.

The embodiments are not limited to this example.

Figure 11:
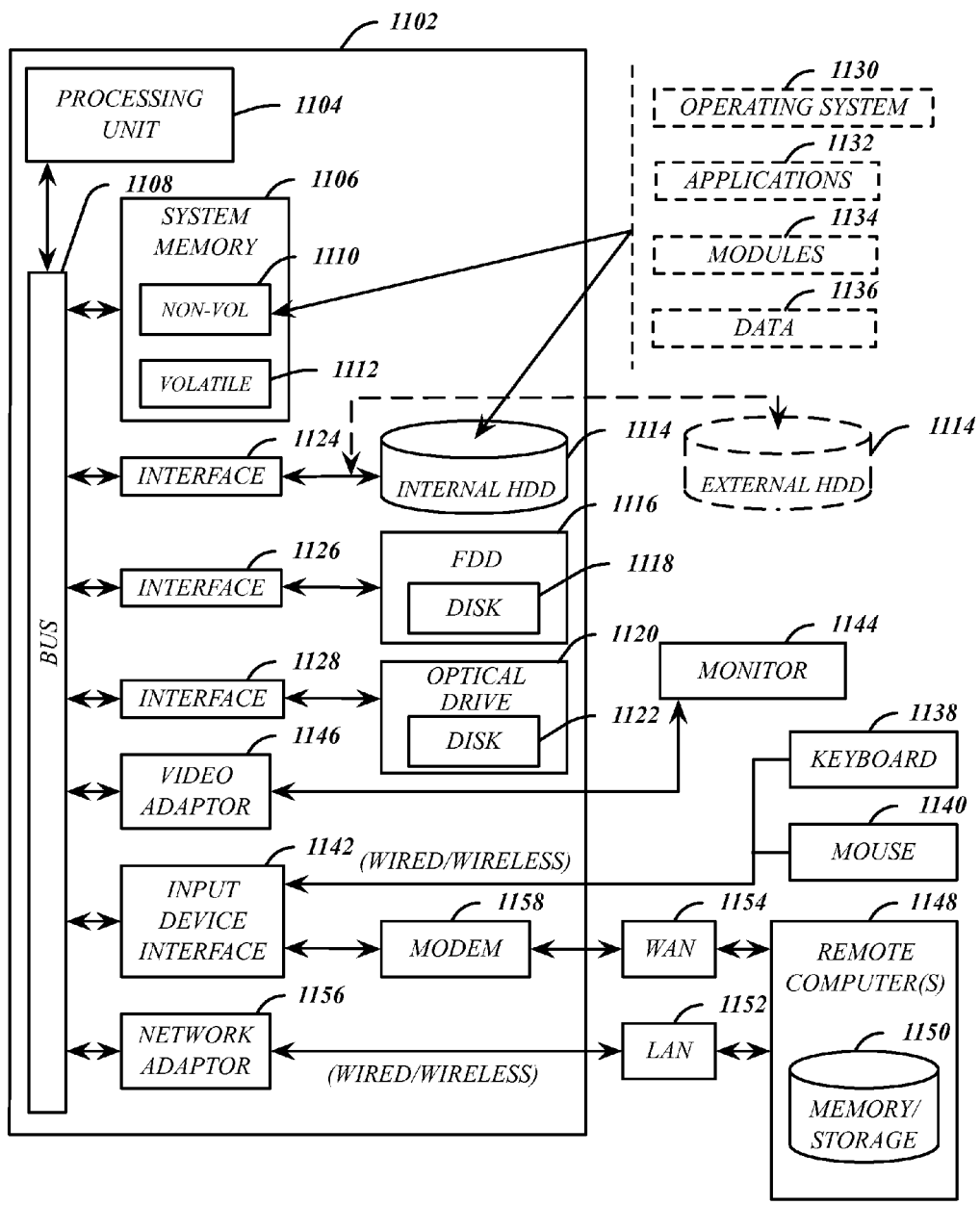
FIG. 11 illustrates an embodiment of a computing architecture.

FIG. 11 illustrates an embodiment of an exemplary computing architecture 1100 suitable for implementing various embodiments as previously described. In one embodiment, the computing architecture 1100 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1100.

As shown in FIG. 11, the computing architecture 1100 comprises a processing unit 1104, a system memory 1106 and a system bus 1108. The processing unit 1104 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1104.

The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures. Interface adapters may connect to the system bus 1108 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1100 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 11, the system memory 1106 can include non-volatile memory 1110 and/or volatile memory 1112. A basic input/output system (BIOS) can be stored in the non-volatile memory 1110.

The computer 1102 may include various types of computer-readable storage media in the form of one or more lower speed memory units, including an internal (or external) hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1110, 1112, including an operating system 1130, one or more application programs 1132, other program modules 1134, and program data 1136. In one embodiment, the one or more application programs 1132, other program modules 1134, and program data 1136 can include, for example, the various applications and/or components of the notification support system 110.

A user can enter commands and information into the computer 1102 through one or more wire/wireless input devices, for example, a keyboard 1138 and a pointing device, such as a mouse 1140. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1104 through an input device interface 1142 that is coupled to the system bus 1108, but can be connected by other interfaces such as a parallel port, IEEE 1394 serial port, a game port, a USB port, an IR interface, and so forth.

A monitor 1144 or other type of display device is also connected to the system bus 1108 via an interface, such as a video adaptor 1146. The monitor 1144 may be internal or external to the computer 1102. In addition to the monitor 1144, a computer typically includes other peripheral output devices, such as speakers, printers, and so forth.

The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 12:
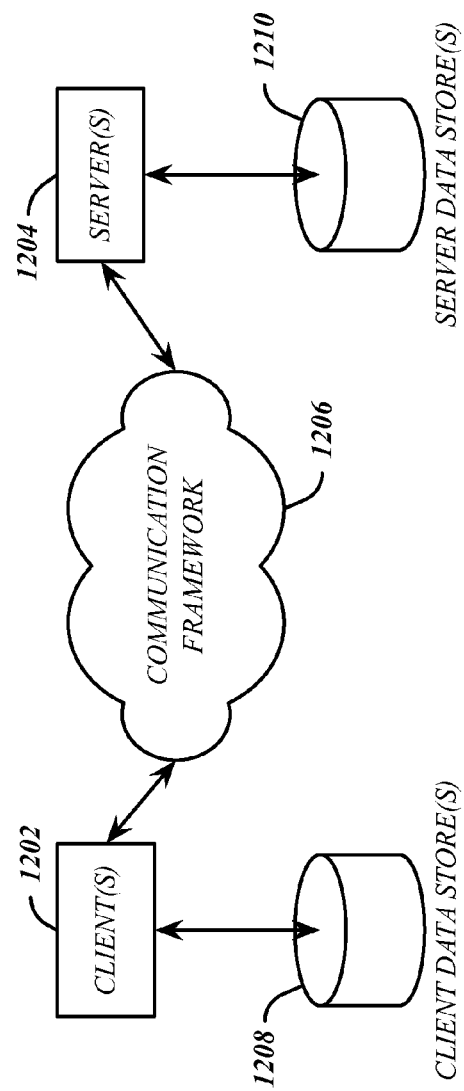
FIG. 12 illustrates an embodiment of a communications architecture.

FIG. 12 illustrates a block diagram of an exemplary communications architecture 1200 suitable for implementing various embodiments as previously described. The communications architecture 1200 includes various common communications elements, such as a transmitter, receiver, transceiver, radio, network interface, baseband processor, antenna, amplifiers, filters, power supplies, and so forth. The embodiments, however, are not limited to implementation by the communications architecture 1200.

As shown in FIG. 12, the communications architecture 1200 comprises includes one or more clients 1202 and servers 1204. The clients 1202 may implement the client device 910. The servers 1204 may implement the server device 950. The clients 1202 and the servers 1204 are operatively connected to one or more respective client data stores 1208 and server data stores 1210 that can be employed to store information local to the respective clients 1202 and servers 1204, such as cookies and/or associated contextual information.

The clients 1202 and the servers 1204 may communicate information between each other using a communication framework 1206. The communications framework 1206 may implement any well-known communications techniques and protocols. The communications framework 1206 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1206 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1202 and the servers 1204. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

With general reference to notations and nomenclature used herein, the detailed descriptions included may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
receiving a message bundle, the message bundle comprising a message and a query, the query comprising a search term;
searching fields in a plurality of recipient records according to the query to determine a plurality of recipients associated with recipient records that match the query; and
pushing the message to the plurality of recipients.

2. The method of claim 1, each of the plurality of recipient records specific to a particular application installed on a particular device.

3. The method of claim 1, wherein pushing the message to the plurality of recipients comprises submitting a plurality of notifications to one or more notification services, each of the plurality of notifications corresponding to one of the plurality of recipients.

4. The method of claim 1, the message bundle received using a developer user-notification interface.

5. The method of claim 1, the message bundle received from a user application on a mobile device.

6. The method of claim 1, the query specifying a geographical location, the determined plurality of recipients comprising those recipients with recipient records comprising geographical information corresponding to the geographical location, further comprising:
receiving a recipient record update to geographical information stored in one of the plurality of recipient records from a mobile device, the recipient record update comprising a current location of the mobile device.

7. The method of claim 1, wherein comparing the query to the plurality of recipient records comprises:
dividing the plurality of recipient records into a plurality of record groups; and
examining each of the plurality of record groups in parallel to determine the plurality of recipients.

8. The method of claim 7, the plurality of recipients comprising a plurality of installations of a particular application, the plurality of recipient records divided into a particular number of record groups based on a quantity of total installations of the particular application.

9. An apparatus, comprising:
a processor circuit on a device;
a submission component operative on the processor circuit to receive a message bundle, the message bundle comprising a message and a query, the query comprising a search term;
a query component operative on the processor circuit to search fields in a plurality of recipient records according to the query to determine a plurality of recipient records matching the query, each of the plurality of recipient records corresponding to a particular installation of a particular application onto a particular device; and
a delivery component operative on the processor circuit to push the message to a plurality of installed applications corresponding to the plurality of recipients records matching the query.

10. The apparatus of claim 9, the delivery component operative to push the message to the plurality of installed applications by submitting a plurality of notifications to one or more notification services, each of the plurality of notifications corresponding to one of the plurality of installed applications.

11. The apparatus of claim 9, the submission component operative to receive the message bundle from a first installed application on a mobile device, the first installed application corresponding to one of the plurality of recipient records.

12. The apparatus of claim 9, the query specifying a geographical location, the determined plurality of installed applications comprising those installed applications with associated recipient records containing geographical information corresponding to the geographical location, further comprising:
  a record update component operative to receive a recipient record update from a first installed application on a first mobile device, the recipient record update comprising a current location of the first mobile device, and to update a first recipient record according to the recipient record update, the first recipient record corresponding to the first installed application.

13. The apparatus of claim 9, the query component operative to divide the plurality of recipient records into a plurality of record groups and to examine each of the plurality of record groups in parallel to determine the plurality of recipients.

14. The apparatus of claim 13, the query component operative to divide the plurality of recipient records into a particular number of record groups based on a quantity of total installations of the particular application.

15. At least one computer-readable storage medium comprising instructions that, when executed, cause a system to:
  receive a message bundle, the message bundle comprising a message and a query, the query comprising a search term;
  search fields in a plurality of recipient records according to the query to determine a plurality of recipients associated with recipient records that match the query; and
  submit a plurality of notifications to one or more notification services, each of the plurality of notifications corresponding to one of the plurality of recipients and comprising the message.

16. The computer-readable storage medium of claim 15, each of the plurality of recipient records specific to a particular application installed on a particular device.

17. The computer-readable storage medium of claim 15, the message bundle received from a user application on a mobile device.

18. The computer-readable storage medium of claim 15, the query specifying a geographical location, the determined plurality of recipients comprising those recipients with recipient records comprising geographical information corresponding to the geographical location, comprising further instructions that, when executed, cause a system to:
  receive a recipient record update to geographical information stored in one of the plurality of recipient records from a mobile device, the recipient record update comprising a current location of the mobile device.

19. The computer-readable storage medium of claim 15, comprising further instructions that, when executed, cause a system to:
  divide the plurality of recipient records into a plurality of record groups; and
  examine each of the plurality of record groups in parallel to determine the plurality of recipients.

20. The computer-readable storage medium of claim 19, the plurality of recipients comprising a plurality of installations of a particular application, the plurality of recipient records divided into a particular number of record groups based on a quantity of total installations of the particular application.

* * * * *